ness and efficient output of text.

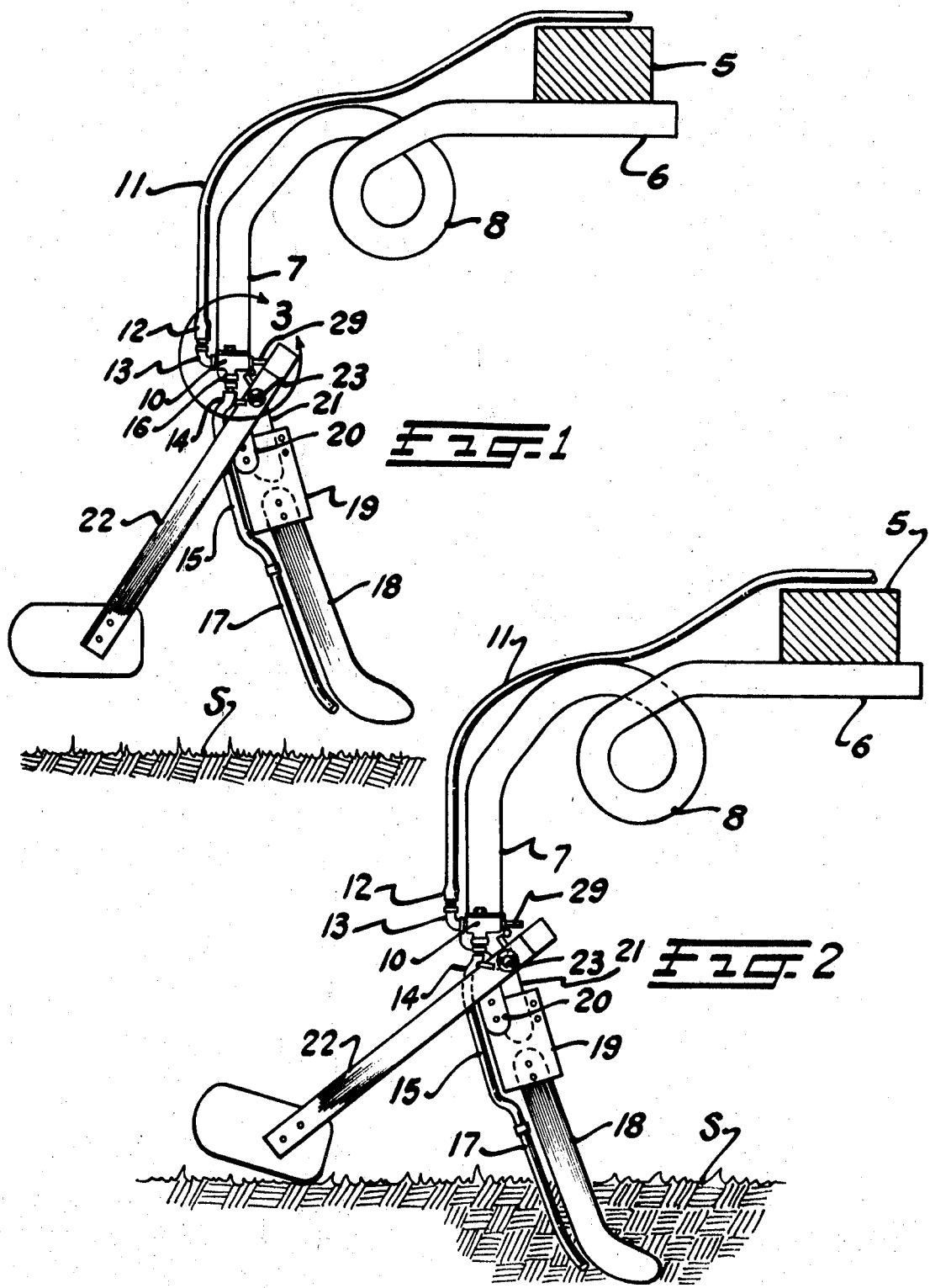

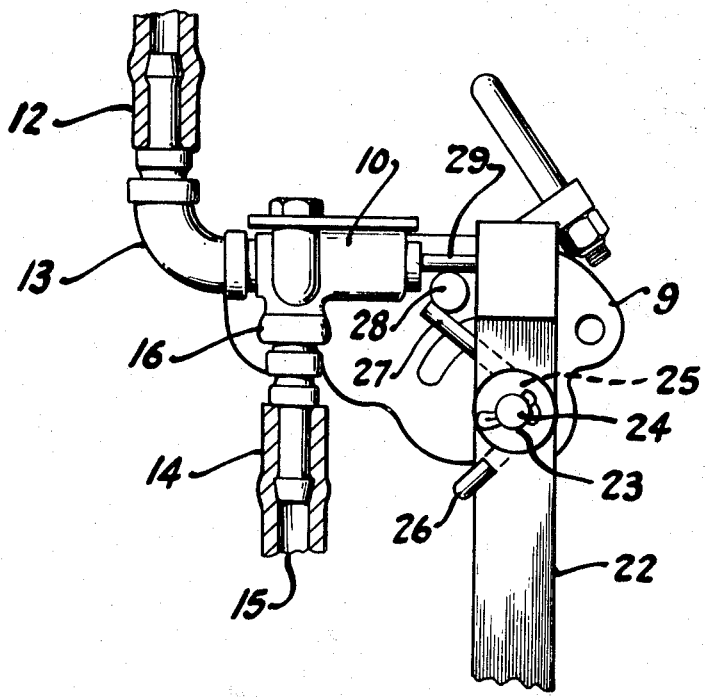

United States Patent Office 3,621,800
Patented Nov. 23, 1971

3,621,800
RELEASE MECHANISM FOR ANHYDROUS AMMONIA APPLICATORS
Arthur J. Rellinger, R.R. 2, Fort Jennings, Ohio 45844
Filed June 30, 1970, Ser. No. 51,076
Int. Cl. A01c 23/02
U.S. Cl. 111—7  5 Claims

ABSTRACT OF THE DISCLOSURE

This invention consists of a horizontally disposed valve mounted on a vertically disposed bracket secured to the lower end of the shank of an ammonia applicator which may be a harrow or a similar tillage farm implement. The aforesaid valve has its inlet connected by a hose to an ammonia supply tank and its outlet connected by a hose to a tube that extends vertically down the back edge of the knife of the aforesaid applicator or the like. The aforesaid valve is opened and closed by having its plunger activated by the upper and back end of the cover arm of the applicator. The aforesaid cover arm is swingably mounted on a horizontally disposed shaft that extends outwardly from the aforesaid bracket. The aforesaid cover arm is moved whenever its lower end comes in contact or ends contact with the soil over which the aforesaid ammonia applicator is being moved. The opening or closing of the aforesaid valve releases or stops the flow of anhydrous ammonia out of the aforesaid tube, as will hereinafter be described.

---

This invention relates to release mechanisms for anhydrous ammonia applicators; more particularly, to a release mechanism that is automatic in its operation, as will hereinafter be described. As those experienced in the art of agrology know, ammonia applicators are farm implements used to inject ammonia into the soil. The applicator may be in the form of an attachment to harrows or the like or it may be a separate farm implement especially designed to inject the aforesaid ammonia into the soil.

It is the principal object of this invention to provide a release mechanism for anhydrous ammonia applicators that is fully automatic in its operation.

Another object of this invention is to provide a release mechanism for anhydrous ammonia applicators that can be secured to the tool bar of nearly any harrow or the like.

Another object of this invention is to provide a release mechanism for anhydrous ammonia applicators, the aforesaid mechanism embodying a valve that is secured to the lower part of the shank of an applicator with standard hose fittings.

Still another object of this invention is to provide a release mechanism for anhydrous ammonia applicators, the mechanism being suitable for packaging and retailing to the farmer who normally has some knowledge and experience in the mechanics of implements and can therefore mount the mechanism on the applicator with ordinary tools found on the farm in a minimum of time and with a minimum of effort.

Other objects and advantages of this novel invention of a release mechanism for anhydrous ammonia applicators will no doubt appear as the invention is now described in detail with reference to the accompanying drawings in which:

FIG. 1 is a side view of this invention mounted on the tool bar of an anhydrous ammonia applicator, the invention having its valve in an off position as the knife is in a raised position above the ground.

FIG. 2 is a side view similar to that of FIG. 1 except that the valve is in an on position as the knife has now been lowered and has cut into the ground.

FIG. 3 is an enlarged side view of this invention that is enclosed within the arrowed circle and indicated by the number 3 in FIG. 1 except that the cover arm is shown in a vertical position.

In the several views of the accompanying drawings like parts of this invention are indicated by like reference numbers.

Directing one's attention first to FIG. 1 of the accompanying drawings it will be seen that there is herein illustrated a tool bar 5 of a typical anhydrous ammonia applicator or harrow or the like. One end 6 of the shank 7, having a coiled portion 8, is suitably secured to the underside of the aforesaid tool bar 5. The lower end of the aforesaid shank 7 is fastened to a vertically disposed bracket 9, seen only in FIG. 3, on one side of which is secured the valve 10 of this invention. A hose 11 through which the anhydrous ammonia flows has its lower end 12 suitably secured to the elbow 13 that is screwed into the aforesaid valve 10. The upper end of the aforesaid hose 11 is attached to the ammonia supply tank on the applicator or the like. Neither the ammonia supply tank nor any other part of the applicator other than the previously mentioned tool bar 5 and the details attached to the aforesaid shank 7 are illustrated in the accompanying drawings since they have no real bearing on this invention.

Continuing to look at the aforesaid FIG. 1 of the drawings, as well as at FIG. 3 which more clearly shows the actual construction of this invention, it will be seen that the upper end 14 of the hose 15 is secured to the outlet 16 of the aforesaid valve 10, while the lower end of the same hose 15 is secured to the upper end of a tube 17 that has its lower end terminating just above and behind the lower end of the knife 18 that has its upper end fastened to a rectangular plate 19. The just mentioned plate 19 is in turn fastened to both a second bracket 20 and to a strap 21 which has its upper end held by the aforesaid bracket 9 (FIG. 3). A cover arm 22 is swingably secured at 23 to the aforesaid bracket 9 by means of the horizontally disposed shaft 24 on which is located the coil spring 25 that has one end 26 hooked over the rear edge of the cover arm 22 while the other end 27 of the same coil spring rests against the cover arm stop 28 that is located under the valve plunger 29. The outer end of the aforesaid valve plunger 29 rests against the upper end of the already mentioned cover arm 22 of this invention, thereby completing the construction of the invention. It will be fully understood by those experienced in the art that there are a plurality of the just described mechanisms in parallel spaced relation to each other along the aforesaid tool bar 5 although only one of the devices is illustrated in the accompanying drawings for reasons of clarity.

Now that the detailed construction of this invention has been described, as well as its mounting on the tool bar of a harrow or the like, it is stated for those having little or no knowledge of the art or experience with farm implements, that the present procedure for injecting anhydrous ammonia into the soil is to place the knife in the soil and then pull a rope that releases the ammonia. The applicator must be in motion to do this and the result is that the applicator is anywhere from five to fifteen feet from the starting point before the ammonia is released. With the use of this invention whose construction has just been described, the anhydrous ammonia will be released the moment the knife 18 is in the soil which is indicated in FIGS. 1 and 2 of the accompanying drawings by the capital letter S. This will occur when the aforesaid knife is only one or two feet from the starting point of the applicator.

In actual operation, the ammonia will be allowed to flow down through the aforesaid tube 17 when the tool bar 5 of the harrow (or applicator) is lowered down into working position. The release of the ammonia is fully automatic by reason of the aforesaid valve 10. The flow of the ammonia automatically stops when the tool bar 5 is raised for turning and/or transport. With the present means of injecting ammonia into the soil it is necessary to pull the rope anywhere from five to fifteen feet from the desired stopping point in order to get the ammonia that is in the aforesaid hose 11 and tube 17 to be expelled from the same. However, if this is done too soon there is an area that does not receive any ammonia and if it is done too late the aforesaid knife 18 is raised and the expelled ammonia is released above the soil and will thus damage the crop that is being treated. With the use of this invention of an anhydrous ammonia release control, the knife can be raised at the stopping point and no ammonia will be expelled because it will be shut off at the knife when the knife is raised from the soil. The anhydrous ammonia release control is a device which is used in connection with the present nitrolator which controls the amount of flow per acre.

No detail description of the actual operation of the mechanism of the invention is herein given as the accompanying drawings are self-explanatory to even the most inexperienced person in the art of reading drawings.

What I now claim as new and desire to secure by Letters Patent is:

1. In an ammonia applicator having a frame, an ammonia tank mounted thereon, a tool shank depending from said frame, mounting means connected to said tool shank, a knife mounted on said mounting means, a cover arm pivotally connected to said mounting means and extending downwardly and to the rear of said knife, tubing establishing a flow line extending from said tank to a point adjacent the lower trailing edge of said knife, the improvement comprising valve means on said mounting means and connected to said tubing and being adapted to control the ammonia flow in said line, means on said cover arm to bias the trailing portion of said arm toward the ground and the upper portion toward a section of said valve means, the proximity of said valve means and upper end being such that elevation of the applicator from a working position will cause the upper portion to engage and actuate said valve means to reduce the flow of ammonia therethrough.

2. The invention of claim 1, wherein said mounting means comprises a vertically disposed bracket projecting downward from the lower end of the said shank.

3. The invention of claim 2, wherein said valve section engaged by said cover arm is a plunger.

4. The invention of claim 2, wherein the upper portion of said cover arm is mounted on a horizontally disposed shaft that extends outward from said bracket below and forward of said valve.

5. The invention of claim 4, wherein said biasing means comprises a coil spring located on said shaft between said bracket and said cover arm, and one end of said coil spring being bent around rear edge of said cover arm; and other end of coil spring resting against a cover stop that projects outward horizontally from said bracket below said plunger of said valve.

References Cited
UNITED STATES PATENTS

| | | | |
|---|---|---|---|
| 2,357,141 | 8/1944 | Singleton | 111—7 X |
| 3,003,664 | 10/1961 | Cave | 111—7 X |
| 3,504,646 | 4/1970 | Trahms | 111—7 |

ROBERT E. BAGWILL, Primary Examiner